United States Patent [19]

Johannes et al.

[11] 4,383,055

[45] May 10, 1983

[54] PROCESS FOR PREPARING HEAT-CURABLE, WATER-DILUTABLE COATING COMPOSITIONS AND THEIR USE AS COATINGS

[75] Inventors: Gerhard Johannes, Taunusstein; Helmut Dürr, Frankfurt am Main; Dieter Plath; Diedrich Schneider, both of Wiesbaden; Klaus Esser, Heinrichsthal, all of Fed. Rep. of Germany

[73] Assignee: Hoechst Aktiengesellschaft, Frankfurt am Main, Fed. Rep. of Germany

[21] Appl. No.: 309,505

[22] Filed: Oct. 7, 1981

[30] Foreign Application Priority Data

Oct. 10, 1980 [DE] Fed. Rep. of Germany ....... 3038243

[51] Int. Cl.$^3$ ............................................. C08L 63/02
[52] U.S. Cl. .................................... 523/221; 427/410; 428/418; 523/402; 524/902
[58] Field of Search ................ 525/438; 523/402, 221; 524/902, 904, 539, 845

[56] References Cited

U.S. PATENT DOCUMENTS 4,223,097 9/1980 Johannes .............................. 525/107

FOREIGN PATENT DOCUMENTS 2248836 4/1973 Fed. Rep. of Germany .

*Primary Examiner*—Theodore E. Pertilla
*Attorney, Agent, or Firm*—Hammond & Littell, Weissenberger and Muserlian

[57] ABSTRACT

Preparation of heat-curable, water-dilutable coating compositions based on (A) epoxy resins free from amino groups, (B) an aqueous dispersion or solution of saturated polyester resins or the modification products thereof with oils, (C) organic cross-linking agents and optionally (D) pigments and/or conventional adjuvants, in specific proportions, these components being processed together in one or more stages, while being comminuted from their original particle size, to form a homogeneous coating composition which has a particle size of less than 100 μm, and the use of the coating compositions thus obtained as coating agents, particularly for coating metal substrates, by the use of current-free methods of application or electrostatic spraying.

11 Claims, No Drawings

PROCESS FOR PREPARING HEAT-CURABLE, WATER-DILUTABLE COATING COMPOSITIONS AND THEIR USE AS COATINGS

The invention relates to a process for preparing heat-curable, water-dilutable coating compositions and their use as coatings, particularly for metal substrates, applied by current-free methods, such as spraying, dipping, flooding and rolling, and electrostatic spraying.

In industry, the operating sequence of application, cross-linking, sanding and overpainting is often used for painting, particularly for painting vehicles, more especially motor cars.

From German OLS No. 22 48 836, it is known to prepare coating compositions for electrolytic deposition by the following steps, which are closely related to the preparation of powdered coating compositions:
1. Mixing the components of the powdered coating composition;
2. Extruding the mixture;
3. Cooling the extruded material;
4. Grinding the extruded material to form a powdered coating composition with a maximum particle size of 100 μm;
5. Addition of the ground powdered coating composition to a cationic binder;
6. Homogenisation; and
7. Addition of water to the coating composition to give the desired solids content for electrolytic application.

The coating compositions produced in this way consist of a cationic resin used as binder, and of a powdered non-ionic resin, which contains conventional additives such as pigments which are prepared in separate operations and then incorporated in the coating composition. With these coating compositions, coatings having a thickness of more than 30 μm can be obtained.

From Modern Paint Coating, 1979, 69 (6), 53-55 (CIBA-GEIGY, Switzerland), it is also known to produce coating compositions for current-free methods of application or for electrostatic coating, in a similar manner to that described in German Offenlegungsschrift No. 22 48 836, namely by steps 1 to 4 and 7 specified above and by the following additional steps:
5a. suspending the powdered coating composition in water; and
6a. finely grinding the mixture of powdered composition and water in a bead mill.

In the known process, a powdered coating composition is always produced first and, during production, in the extruder, this composition is generally subjected to temperatures of 100° to 130° C., for a length of time which depends on the extrusion parameters of temperature and friction. At these temperatures, a preliminary reaction generally occurs which causes an increase in the melting viscosity and hence poor flow qualities and inadequate wetting of substrates, and thus has a detrimental effect on film formation with the coating compositions during later processing. Moreover, there is a reduction in the mechanical strength of the coatings during dynamic deformation or expansion. The resistance to corrosive agents is also impaired. The disadvantages in film formation also have a detrimental effect when the coatings obtained by electrolytic application and chemical cross-linking are processed further, e.g. if the unevenness of the surface is to be reduced by sanding. Naturally, more sanding is required, the more uneven the surface, i.e. the poorer the flow of the coating composition. However, sanding is necessary to ensure that the finishing coatings subsequently applied have the best possible optical appearance.

However, with the coating compositions known from German OLS No. 22 48 836, coating films are obtained which, in practice, cannot be considered for a wide range of applications, owing to the disadvantages described above, even though there is a considerable demand for such products.

From European Patent Application No. 15035, coating mixtures based on a water-dilutable maleinised oil are also known, which are characterised in that they contain a binder made up of 30 to 95 wt.-% of the water-dilutable maleinised oil and 5 to 70 wt.-% of a solid, ground compound containing epoxide groups, this compound having a particle size of 0.5 to 35 μm, an average molecular weight of at least 1000 and an epoxy equivalent weight of 450 to 7500, the percentages by weight referring to the total of the two solvent-free components. In the preparation of the maleinised oil, a 2.5- to more than 5-fold excess of maleic anhydride is used, in relation to the unsaturated fatty acid ester used, so that a large number of functional hydroxyl groups are available for further reactions.

The invention, however, proposes a method of preparing coating compositions which is considerably simpler than the methods of German Offenlegungsschrift No. 22 48 836 and that described in the journal Modern Paint Coating, whilst the coating compositions do not have the disadvantages mentioned in connection with these references and, moreover, have better properties. The advantages of the process according to the invention over the two references mentioned above are that, in the process according to the invention, it is impossible for the components to react during processing, since, unlike the processes in the prior art referred to hereinbefore, the process of the invention is carried out at such low temperatures that melting of the reaction components does not occur, thus preventing a preliminary reaction which, as is well known, starts up much more quickly in the liquid phase than in the solid state. Another advantage is the considerable reduction in the work of cleaning the apparatus used, since the reaction product or parts thereof do not adhere or cake on to the walls of the processing containers at the temperatures used.

A further advantage is that certain technically complex and expensive steps can be eliminated. Finally, the coating compositions obtained by the process according to the invention differ from those prepared according to the prior art in that the composition of the coatings can be adjusted during production, without the need to repeat any complex steps.

The invention relates to a process for preparing heat-curable, water-dilutable coating compositions based on
(A) 1-90 wt.-% of at least one epoxy resin free from amino groups and solid at ambient temperature,
(B) 10-90 wt.-% of at least one synthetic resin having functional groups, which is in the form of a solution or dispersion with a solids content of 10-70 wt.-%,
(C) 0.05-40 wt.-% of at least one organic cross-linking agent which is liquid and/or solid at ambient temperature, and
(D) 0-75 wt.-% of pigments and/or conventional adjuvants, whilst components (A) to (D), which always total 100 wt.-% and the quantities of which are specified with reference to solvent-free or anhydrous substances, are processed together in one or more stages, with comminution to reduce their size from the original particle size and obtain a homogeneous coating composition which has a particle size of less than 100 μm and subsequently, if required, is adjusted with water to the solids content required for application, characterised in that component (B) is an aqueous dispersion or solution of saturated (i.e. non-polymerisable) acid-functional polyester resins consisting of C, H and O, or of the modification products thereof with oils, the polyester resins being at least partially neutralised with amines and having an acid number of at least 30 and generally not more than 120 and an OH number of 10 to 150, the sum of acid number and hydroxyl number being at least sufficiently large to ensure that the at least partially neutralised polyester resin forms a stable aqueous dispersion or solution.

The process according to the invention may be carried out discontinuously or, preferably, continuously. The solid starting products together with the other components are ground in suitable apparatus. Advantageously, at least one stage is carried out in the wet, e.g. in the presence of water. The concentration of the ground material depends on the viscosity of the material; it must remain capable of being pumped. Generally, pastes of ground material of this kind have a solids content of up to 80, preferably up to 50 wt.-%. The coating mixture obtained is then adjusted with water to form a dispersion having the desired solids content of, in general, 5 to 80, preferably 5 to 40 wt.-%, if it does not already have this solids content.

After grinding is complete, the particle size of the solid components of the coating composition generally should be not more than 15, or particularly not more than 5 μm.

Examples of suitable grinding apparatus for reducing the particle size include oscillatory mills, impact mills, pinned disc mills, hammer mills, air jet mills, planetary ball mills and sifting mills and stirrer-type mills such as sand or bead mills, colloid mills and extruders, which may operate individually or in series, whilst it is also possible to combine different types of mill. Preferably, water is used as the liquid phase in the wet operation.

The epoxy resin (A) is solid at ambient temperature, but melts and flows at the cross-linking temperature and thus forms a layer and imparts corrosion resistance and impact strength to the coating. Preferred epoxy resins are those based on diphenylolpropane (bisphenol A) and/or diphenylolmethane (bisphenol F) and epihalohydrin and/or methylepihalohydrin, preferably epichlorohydrin, and which may be prepared by the one-step or two-step processes described in the literature (cf. for example "Epoxy compounds and epoxy resins", Paquin (1958), p. 322ff), e.g. those having a Durrans softening point (SP) of at least 70° C. and an epoxy equivalent weight (EE) of at least 490; suitable products are for example those having an SP 93°–104° C. and EE 875 to 1000 and SP 118° C. and EE 1865. Component (A) is generally used in amounts of 5 to 50, preferably 10 to 40 wt.-%. These quantities, and those given hereinafter, relate in each case to 100% by weight of components (A)–(D).

The saturated polyester resin of component (B), which preferably has an acid number of 45–80, is at least one cross-linking intermolecular heat-curable resin containing functional groups, which, together with any amine resin in component (C), constitutes the binder for all the components contained in the coating composition and is used as an aqueous solution or dispersion, preferably in amounts of from 10 to 70, more particularly from 15 to 50 wt.-% (based on solids content). It is in the form of an aqueous solution or dispersion, generally at ambient temperature, preferably having a solids content of 20 to 70 wt.-% and containing as the solvent water and possibly at least one organic water-miscible solvent, such as a water-miscible alcohol, e.g. methanol, ethanol, n- and isopropanol, a glycol monoether or a ketone.

Polyester resins suitable for use as component (B) can be produced by conventional methods from polycarboxylic acids and polyhydric alcohols, some of which are at least trihydric. Examples of carboxylic acids are aliphatic, cycloaliphatic and/or aromatic carboxylic acids, preferably di-, tri- and possibly tetracarboxylic acids with, for example, 4 to 12 carbon atoms per molecule or the anhydrides thereof, where they exist, or the esters thereof. Particular examples which may be mentioned are ortho-, iso- and terephthalic acid, tetrahydro- and hexahydrophthalic acid, trimellitic, pyromellitic, succinic, adipic and sebacic acid or the anhydrides thereof, where they exist, and also halogenated acids such as chlorophthalic acids and hexachloroendomethylene tetrahydrophthalic acid.

Examples of alcoholic components include polyhydric alcohols, e.g. dihydric alcohols such as ethane-diol, 1,2- or 1,3-propanediol, the various butane-, pentane- and hexanediols such as butanediol-1,4, neopentylglycol and hexanediol-1,6, di- and triethyleneglycol, ethoxylated and perhydrogenated bisphenols, trimethylolethane and -propane, glycerol and pentaerythritol.

If desired, chain-stopping monovalent compounds, namely monocarboxylic acids such as benzoic acid or monohydric alcohols such as the various propanols, butanols, cyclohexanol and benzyl alcohol may be added both to the acid component and to the alcohol component.

Examples of modification products with oils include those obtained with fatty acid esters such as linseed oil, soya oil, safflower oil, castor oil, cottonseed oil, ground nut oil or the fatty acids on which they are based, such as linseed, soya and safflower fatty acids. Modification with products obtained by dimerisation from natural unsaturated oils or fatty acids is also possible, and also, in particular, saturated fatty acids such as coconut oil acid.

Examples of products for neutralising the polyester resin are the amines which are generally used in the preparation of water-soluble systems, e.g. triethylamine.

Cross linking components (C) include for example, imidazole and 2-imidazoline and their derivatives and adducts with epoxy compounds, e.g. those listed above, dicyanodiamide, substituted biguanides and amine resins such as melamine and urea resins. These compounds (C) are added to the composition on their own or as mixtures in amounts of, for example, 0.05 to 40, preferably 0.1 to 30 wt.-%. If component (C) consists of resins, the proportion added is generally 8 to 40, preferably 15 to 30 wt.-%, whereas if component (C) consists of other substances the proportion is generally 0.05 to 8 wt.-%. In combinations of various components (C), a smaller proportion of resin than 8 wt.-% may, of course, be used.

In the process according to the invention, pigments and conventional adjuvants may be added to the coating composition as component (D).

Pigmentation is effected using inorganic and/or organic pigments, such as titanium dioxide and carbon black, the proportion of which should not exceed 70, or preferably 50 wt.-%. Carbon black is generally added in amounts of not more than 10, preferably not more than 5 wt.-%.

Examples of conventional adjuvants include flow agents and wetting agents such as silicone oils and resins, polyacrylates such as poly-n-butylacrylate and poly-2-ethylhexylacrylate, cellulose acetobutyrate and the reaction product of 2 mol of methyl isobutyl ketone and acetylene. These adjuvants are generally used in amounts of up to 5, preferably up to 1 wt.-%. Another adjuvant is finely divided silicic acid, i.e. of the type having a large surface area, which may be added in amounts of up to 10, preferably from 0.5 to 5 wt.-%, as a thixotropic agent or as an agent to prevent sedimentation.

The coating compositions obtained in the process according to the invention are extremely well suited to the current-free or electrostatic coating of metal substrates.

Examples of methods of application for the coating compositions obtained according to the invention include, in addition to an electrostatic method,
   (a) a spray method which is carried out with or without the use of compressed air (so-called airless method) at ambient or elevated temperature (e.g. hot spray process) or electrostatically,
   (b) a dipping method without the use of current,
   (c) a flooding method and
   (d) a rolling method (e.g. coil coating).

The methods of application referred to above are known in the prior art and are well known to anyone skilled in the art. In view of the many variables, there is no need to go into detail. The coating may be applied, for example, to a de-greased or chemically pretreated metal substrate, which may or may not be primed, and also to glass and ceramics.

The coatings obtained using the above-mentioned methods of application are generally converted into chemically cross-linked enamels, after a drying time of 0 to 30 minutes at temperatures of between 80° C. and 300° C. (the corresponding times are 60 minutes or a few seconds, respectively), and these enamels are distinguished, for example, by good adhesion to the substrate, particularly metals, and by their hardness, elasticity, impact strength, corrosion resistance and resistance to solvents. The layer thicknesses generally vary between 3 and 200 μm.

The coating compositions prepared according to this process are used as primers, fillers or top coats, or one-coat paints for coating purposes. They are preferably used as a filler, particularly in the automobile industry. The term "filler" refers to the layer between the primer and the top coat.

In the Example which follows, T represents parts by weight.

EXAMPLE

51 T of titanium dioxide, 0.6 T of carbon black, 4.8 T of talc, 0.6 T of iron oxide yellow, 30 T of hexamethoxymethyl melamine resin with a dynamic viscosity of 6000 mPa.s at 20° C., an acid number of less than 1 (DIN 53183), a pH value of 7.7 (50% in water) and a stoving residue of 95% (DIN 53182), 1.5 T of a reaction product of 2 mol of methyl isobutyl ketone and 1 mol of acetylene, 30 T of deionised water and 30 T of a 50% aqueous dispersion (viscosity about 2000 mPa.s at 20° C.) of a standard commercial alkyd resin based on phthalic acid or the anhydride thereof, a saturated aliphatic dicarboxylic acid, a trihydric alcohol with up to 6 carbon atoms and a fatty acid of moderate chain length, partially neutralised with a tertiary amine up to a pH value of about 8, are ground in a sand mill (weight ratio Ottawa sand: material for grinding=1:1), whilst cooling with water, for 30 minutes at 5000 rpm. The coating composition is completed by the addition of 78 T of the above-mentioned alkyd resin dispersion and 36 T of epoxy resin based on diphenylol propane and epichlorohydrin with a Durrans softening point of 93° to 104° C. and an epoxy equivalent weight of 875 to 1000 in micronised form, i.e. with a maximum particle size of 15 μm (the majority of the particles having a particle size of 4 μm) and 0.6 T of imidazole (in the form of 1.2 T of a 50% solution in water). Finally, the coating composition is ground for a further 5 minutes at 5000 rpm, whilst cooling with water.

After the Ottawa sand has been separated off using a screen (240 μm mesh size) a coating composition having a viscosity of 20 seconds according to DIN 53211 is obtained.

Comparison

49 T of a 40% aqueous solution of a maleinate oil, prepared from 25 T of maleic anhydride and 75 T of soya oil, are mixed with 11 T of the epoxy resin used in the Example. Then 41 T of titanium dioxide are added and this mixture is then ground to a particle size of 25 μm. Then another 6 T of water are added. The mixture has a solids content of 71.5% and a viscosity according to DIN 53211 of 18 seconds.

Both coating compositions are applied in a layer thickness of 50 μm to a flat steel sheet (0.7 mm thick) coated with zinc phosphate, the compositions being applied by spraying in known manner, without the use of compressed air. After a drying period of 10 minutes at ambient temperature (22° C.) the coating is chemically cross-linked in a period of 30 minutes, in a dryer with circulating air, at 160° C. according to the invention and at 170° C. according to the comparison. The coatings obtained have the following properties:

| Test | Invention | Comparison |
|---|---|---|
| Adhesion (DIN 53151) | GT O | GT O |
| Impact strength (ASTM D 2794-69/reverse) | 120 i.p. | 28 i.p. |
| Resistance to xylene | 40 min./22° C. | 10 min./22° C. |
| Elasticity (Erichsen cupping) (DIN 53156) | 10 mm | 2.5 mm |

We claim:
1. In a process for preparing heat-curable, water-dilutable coating compositions based on
   (A) 1–90% by weight of at least one epoxy resin which is solid at ambient temperature and free from amino groups,
   (B) 10–90% by weight of at least one synthetic resin having functional groups, which is in the form of a solution or dispersion with a solids content of 10 to 70% by weight,

(C) 0.05–40% by weight of at least one organic crosslinking agent which is solid or liquid at ambient temperature and (D) 0–75% by weight of at least one component selected from the group consisting of pigments and conventional adjuvants, in which the sum of components (A) to (D) is always 100% by weight and the percentages are referred to the substances free from solvents and water, and the components (A) to (D) are conjointly processed together in at least one stage while reducing the original particle size so far to form a homogeneous coating composition having a particle size of less than 100 $\mu$m and wherein there is, or is not, subsequently water added to adjust the solids content to that required for application, the improvement which consists in using as component (B) an aqueous dispersion or solution of saturated polyester resins having carboxyl groups and consisting of carbon, hydrogen and oxygen, or of modification products obtained therefrom by ester oils, the said polyester resin being at least partially neutralized with amines and having an acid number in the range from 30 to 120 and an OH number of 10 to 150 and the sum of acid number and hydroxy number being at least as high that the polyester resin which is at least partially neutralized forms a stable aqueous dispersion or solution.

2. A process as claimed in claim 1 wherein the amount of component (A) is from 5 to 50% by weight, that of component (B) is from 10 to 70% by weight, that of component (C) is from 0.1 to 30% by weight and wherein component (D) consists of 0 to 70% by weight of pigments and 0 to 5% by weight of other conventional adjuvants.

3. A process as claimed in claim 1, wherein component (C) consists of ($C_1$) resins which are present in an amount of from 8 to 40% by weight or consists of ($C_2$) non-resinous compounds the amount of which is in the range from 0.05 to 8% by weight.

4. A process as claimed in claim 1 wherein component (C) contains as a conventional adjuvant up to 10% of silicic acid.

5. A process as claimed in claim 1, wherein component (C) contains as a pigment up to 10% of carbon black.

6. A process as claimed in claim 1 wherein the grinding process is carried out continuously.

7. A process as claimed in claim 1 wherein particles are obtained having a particle size of not more than 15 $\mu$m.

8. A process as claimed in claim 1 wherein at least one stage is carried out in the presence of water.

9. A process as claimed in claim 1 wherein the coating composition is adjusted by the addition of water to have a solids content of 5 to 80% by weight.

10. A process as claimed in claim 2, wherein component (A) is present in an amount of 10 to 40% by weight, component (B) is present as a solution or dispersion stable at room temperature in an amount ranging from 15 to 50% by weight and has an acid number in the range from 45 to 80, wherein particles are obtained having a particle size of not more than 15 $\mu$m, the process is carried out continuously and in at least one stage in the presence of water, and the homogeneous coating composition is finally adjusted to a solids content of from 5 to 40% by weight based on the total composition.

11. A coating composition prepared according to the process as claimed in claim 1 for coating of a metal substrate by electro powder spraying or a method using no electric current.

* * * * *